United States Patent [19]

Richards

[11] E Re. 30,096

[45] Reissued Sep. 18, 1979

[54] FOOD PATTY MOLDING MACHINE

[75] Inventor: Louis R. Richards, Mokena, Ill.

[73] Assignee: Formax, Inc., Mokena, Ill.

[21] Appl. No.: 851,620

[22] Filed: Nov. 14, 1977

Related U.S. Patent Documents

Reissue of:

[64] Patent No.: 3,887,964
Issued: Jun. 10, 1975
Appl. No.: 220,323
Filed: Jan. 24, 1972

[51] Int. Cl.[2] ..... A22C 7/00

[52] U.S. Cl. ..... 17/32; 425/236; 425/147

[58] Field of Search ..... 17/32, 35, 36, 37, 38, 17/39, 40; 425/236, 240, 241, 147

[56] References Cited

U.S. PATENT DOCUMENTS

| | | | |
|---|---|---|---|
| 2,366,417 | 1/1945 | MacMillin | 91/195 X |
| 2,568,332 | 9/1951 | Genovese | 425/147 |
| 3,101,761 | 8/1963 | Buehler et al. | 17/32 X |
| 3,108,318 | 10/1963 | Miller et al. | 17/39 |
| 3,203,037 | 8/1965 | Anhanger et al. | 17/32 |
| 3,347,176 | 10/1967 | Hall | 17/32 X |
| 3,473,189 | 10/1969 | Middleton | 17/39 X |
| 3,473,579 | 10/1969 | Orloff | 17/38 X |
| 3,490,093 | 1/1970 | Mallas et al. | 17/32 |
| 3,526,924 | 9/1970 | Holly | 17/32 |
| 3,623,188 | 11/1971 | Holly | 17/32 |

FOREIGN PATENT DOCUMENTS

| | | | |
|---|---|---|---|
| 1128541 | 9/1968 | United Kingdom | 17/32 |

*Primary Examiner*—Willie G. Abercrombie
*Attorney, Agent, or Firm*—Kinzer, Plyer, Dorn & McEachran

[57] ABSTRACT

A high speed food patty molding machine, for manufacturing hamburger patties or other molded food products, comprising two large piston pumps operating in overlapping alternation to feed moldable food material continuously to a manifold that in turn feeds a cyclic molding mechanism. The molding mechanism need not operate synchronously with the pumps; the volumetric capacity of each pump is several times larger than the volume of meat or other moldable feed material required to fulfill a molding cycle. The pressure of the food feed is adjustable for different product requirements. The molding mechanism includes an elevator system for raising the complete mold assembly to a changeover position.

10 Claims, 21 Drawing Figures

FOOD PATTY MOLDING MACHINE

Matter enclosed in heavy brackets [ ] appears in the original patent but forms no part of this reissue specification; matter printed in italics indicates the additions made by reissue.

BACKGROUND OF THE INVENTION

Increasing use of pre-processed foods, both in homes and in restaurants and other group eating establishments, has created a continuously growing demand for high-capacity automated food processing equipment. That demand is particularly evident with respect to hamburgers, molded steaks, fish cakes, and other molded food patties. A single drive-in restaurant may serve hundreds or even thousands of hamburgers and other molded food patties each day; a group of such restaurants in a metropolitan area, using a single source of supply, may require many thousand patties daily.

Available automated food patty molding equipment is not well adapted to current high-volume demands. With available equipment, a single food processor may require a large number of molding machines to fulfill his sales requirements. A changeover from the patty size of one customer to that of another, especially if coupled with some difference in the specification for the meat or other moldable food, leads to an inordinate time loss, dissipated in machine set-up time.

Pumping mechanisms for automated food patty molding machines are a source of several operational and maintenance difficulties. The moldable food tends to clog or to "bridge" in the feed apparatus, producing non-uniform patties. Food may collect in the feed mechanism, producing possible spoilage problems. Commonly used non-yielding compressors such as paddle pumps, synchronized with the molding mechanism, often produce a non-uniform feed pressure. The filling pressure fluctuates with machine timing, product viscosity, and the quantity of product that falls in front of the paddles in each cycle; as a result, the mold cavities may be over-filled or under-filled on any given stroke.

Yielding compressors, as used in some conventional machines, utilize springs to back up the food compression pumps; the spring force pushes the food into the mold cavities. On each cycle of the molding mechanism, the compressor opens to receive more food material. The amount of food material captured varies the degree of spring compression, and thus varies the filling pressure, so that underfilling or over-filling may occur. A product exhibiting poor flow characteristics is also difficult to feed into the compression system. Consequently, when full pressure is most needed, it is likely to be unavailable, producing an inconsistent product.

Variation in the pumping pressure to compensate for food material differences may be necessary to obtain a uniform product. Non-yielding paddle pumps often produce inadequate pressures on low-viscosity food materials and excessively high pressures when the material viscosity is high, as when the material is too cold or too dry. Spring adjustment can compensate for some of these differences, in known yielding compression systems, but the range of adjustment is limited, and effective adjustment is often quite difficult for the operator to achieve. The synchronized pumps of both types produce excessive noise levels, often extremely uncomfortable for operating personnel.

SUMMARY OF THE INVENTION

It is a principal object of the present invention, therefore, to provide a new and improved automated food patty molding machine capable of producing uniform molded food patties at a higher rate of production than practical or attainable with previously known equipment.

A more specific object of the invention is to provide a new and improved pumping system for a high speed food patty molding machine that consistently and continuously feeds hamburger or other moldable food material to the molding mechanism of the machine at a high feed rate at substantially uniform pressure. A particular feature of the invention, in this regard, is the provision of a slow-moving large capacity food material pumping system that can compress and pump enough material for several molding cycles while additional material is being received and pressurized for subsequent cycles.

Another object of the invention is to provide a new and improved high speed food patty molding machine that is inherently subject to only minimal wear, in operation, and that requires no more than minimal maintenance.

A further object of the invention is to afford a new and improved high speed food patty molding machine that can be rapidly set up for molding of a new product.

An additional object of the invention is to provide a new and improved high speed patty molding machine that is inherently quiet in operation.

A specific object of the invention is to provide a new and improved high speed food patty molding machine that is simple and inexpensive in construction, and that can be readily disassembled for cleaning of the machine.

Accordingly, the invention relates to a high speed food patty molding machine comprising a molding mechanism having an inlet for receiving moldable food material. The machine further comprises at least two food pumps, each pump including a pump cavity having an intake opening and an outlet opening, a plunger aligned with the cavity, and drive means for moving the plunger between a retracted position clear of the intake opening in the cavity, and a pressure position in which the plunger is advanced inwardly of the cavity, beyond the intake opening, toward the outlet opening. Supply means are provided for supplying moldable food material to the intake opening of each pump cavity whenever the plunger for that pump is in its retracted position. A manifold connects the outlet openings of the two pump cavities to the inlet of the molding mechanism. Actuating means are provided to actuate the pump drive so that at least one pump cavity always contains moldable food material under pressure. Valve means are incorporated in the manifold to seal off the outlet opening of each pump cavity from the manifold whenever the plunger for that pump is moved toward its retracted position, thereby affording a continuous supply of moldable food material, under pressure, to the inlet of the molding mechanism.

DESCRIPTION OF THE PREFERRED EMBODIMENT

Figure 1:
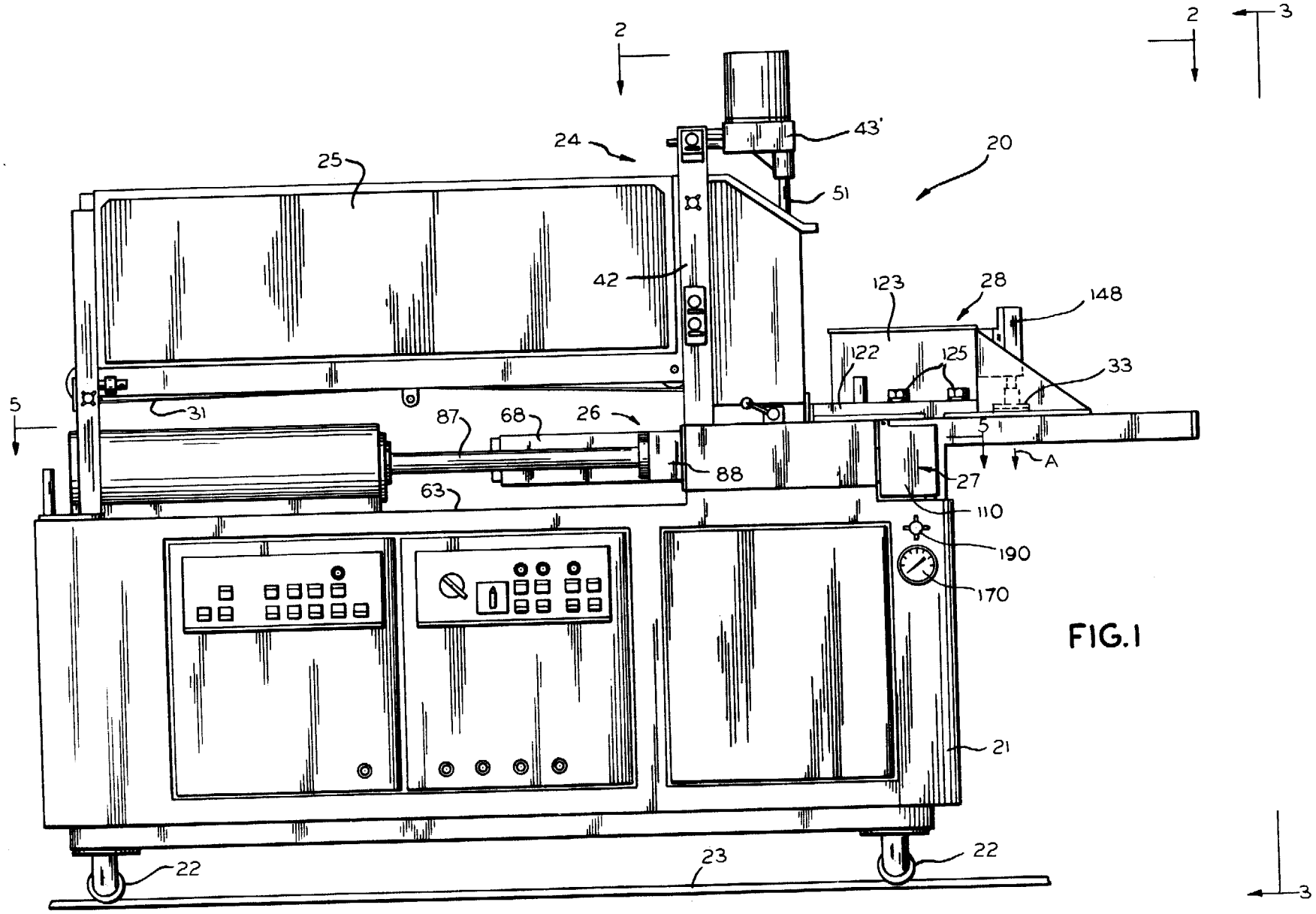
FIG. 1 is a side elevation view of a high speed food patty molding machine constructed in accordance with a preferred embodiment of the present invention.
Figure 2:
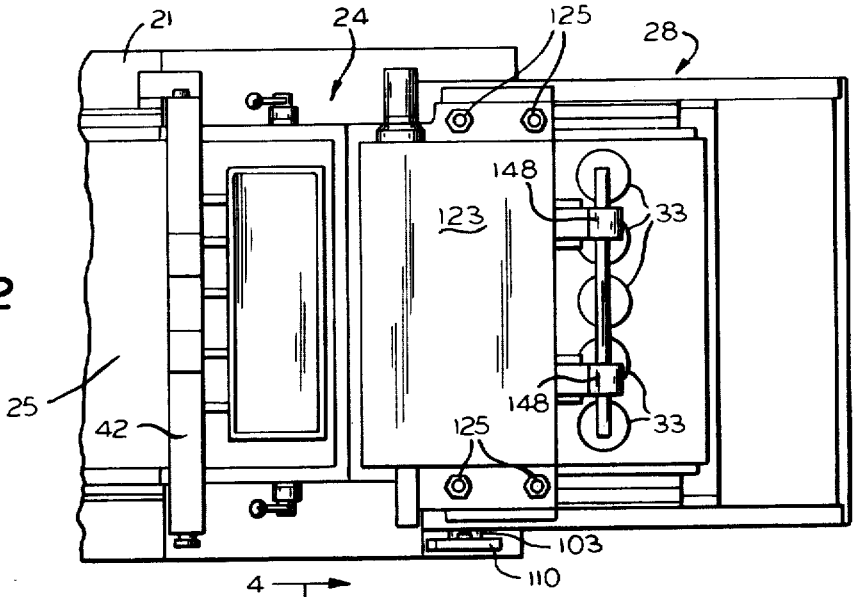
FIG. 2 is a partial plan view taken approximately along line 2—2 of FIG. 1.
Figure 3:
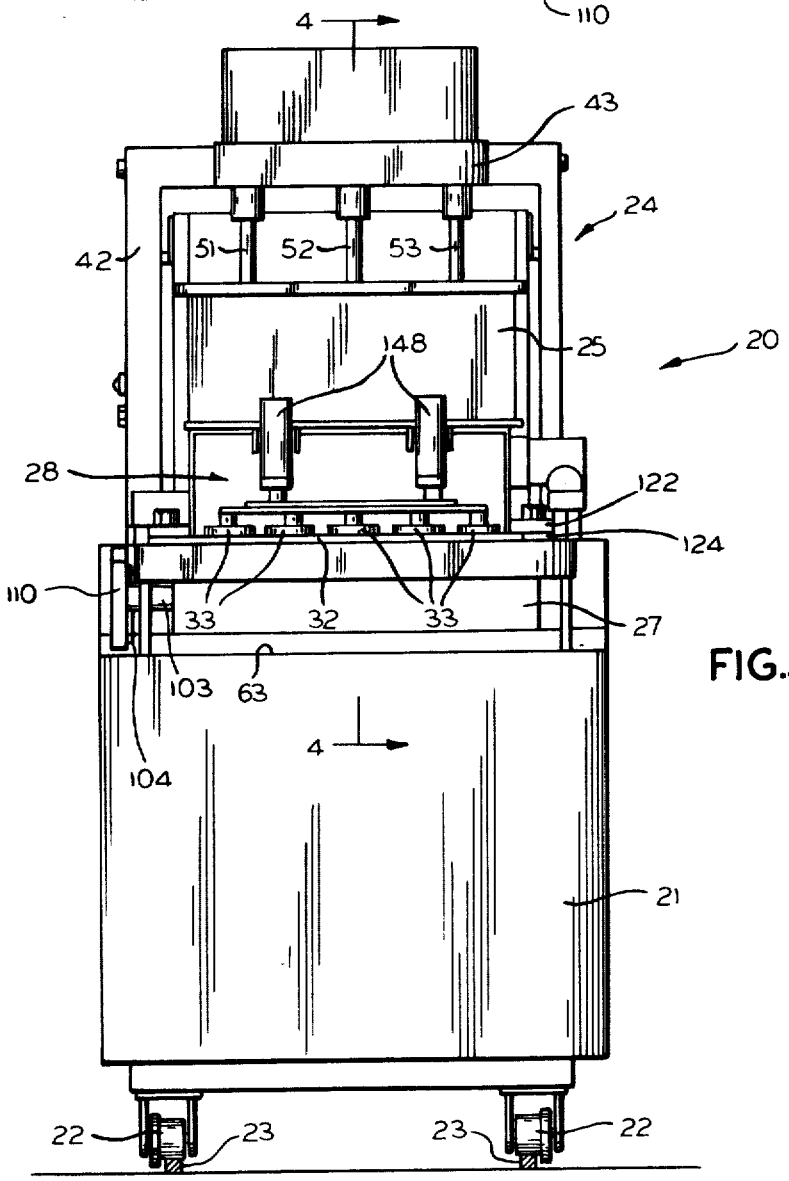
FIG. 3 is an outlet end view taken as indicated by line 3—3 in FIG. 1.

THE GENERAL ORGANIZATION AND OPERATION OF THE PATTY MOLDING MACHINE (FIGS. 1, 2 and 3)

The high speed food patty molding machine 20 illustrated in FIGS. 1, 2 and 3 comprises a preferred embodiment of the invention. Molding machine 20 includes a machine base 21, preferably mounted upon a plurality of rollers or wheels 22. The wheels 22 may rest upon a floor; however, because of the size and weight of machine 20, it is usually preferable to use flanged wheels and to support the machine upon rails 23 as shown in FIGS. 1 and 3. Machine base 21 supports the operating mechanism for machine 20, and contains hydraulic actuating systems, electrical actuating systems, and most of the machine controls.

Molding machine 20 includes a supply means 24 for supplying a moldable food material, such as ground beef, fish, or the like, to the processing mechanisms of the machine. As generally illustrated in FIGS. 1 and 3, supply means 24 comprises a large food material storage hopper 25 that opens into the intake of a food pump system 26. The food pump system 26 includes at least two food pumps, described in detail hereinafter, that continuously pump food, under pressure, into a manifold 27 connected to a cyclically operable molding mechanism 28. Molding mechanism 28 is provided with an elevator system for use in changing the molding mechanism from one product to another, as described in detail hereinafter.

In the operation of machine 20, a supply of ground meat or other moldable food material is dumped into hopper 25 from overhead. In the illustrated construction, hopper 25 is comparable in size to a conventional bathtub, and, accordingly, can hold a large supply of moldable food material (800 to 1000 lbs.). The floor of hopper 25 comprises a conveyor belt 31, seen in FIG. 1, for moving the food material longitudinally of the hopper toward the other components of the food material supply means 24.

At the forward end of hopper 25, the righthand end of the hopper as seen in FIG. 1, the food material is fed downwardly by supply means 24 into the intake of the reciprocating pumps constituting pumping system 26. The pumps of system 26 operate in overlapping alteration to each other; at any given time when machine 20 is in operation at least one of the pumps is forcing food material under pressure into the intake of manifold 27.

The manifold 27 comprises a valving system for feeding the food material, still under relatively high pressure, into the molding mechanism 28. Molding mechanism 28 operates on a cyclic basis, first sliding a multicavity mold plate 32 into receiving position over manifold 27 and then away from the manifold to a discharge position aligned with a series of knockout cups 33. When mold plate 32 is at its discharge position, knockout cups 33 are driven downwardly, discharging the hamburgers or other molded products from machine 20, as indicated by arrow A in FIG. 1.

Figure 4:
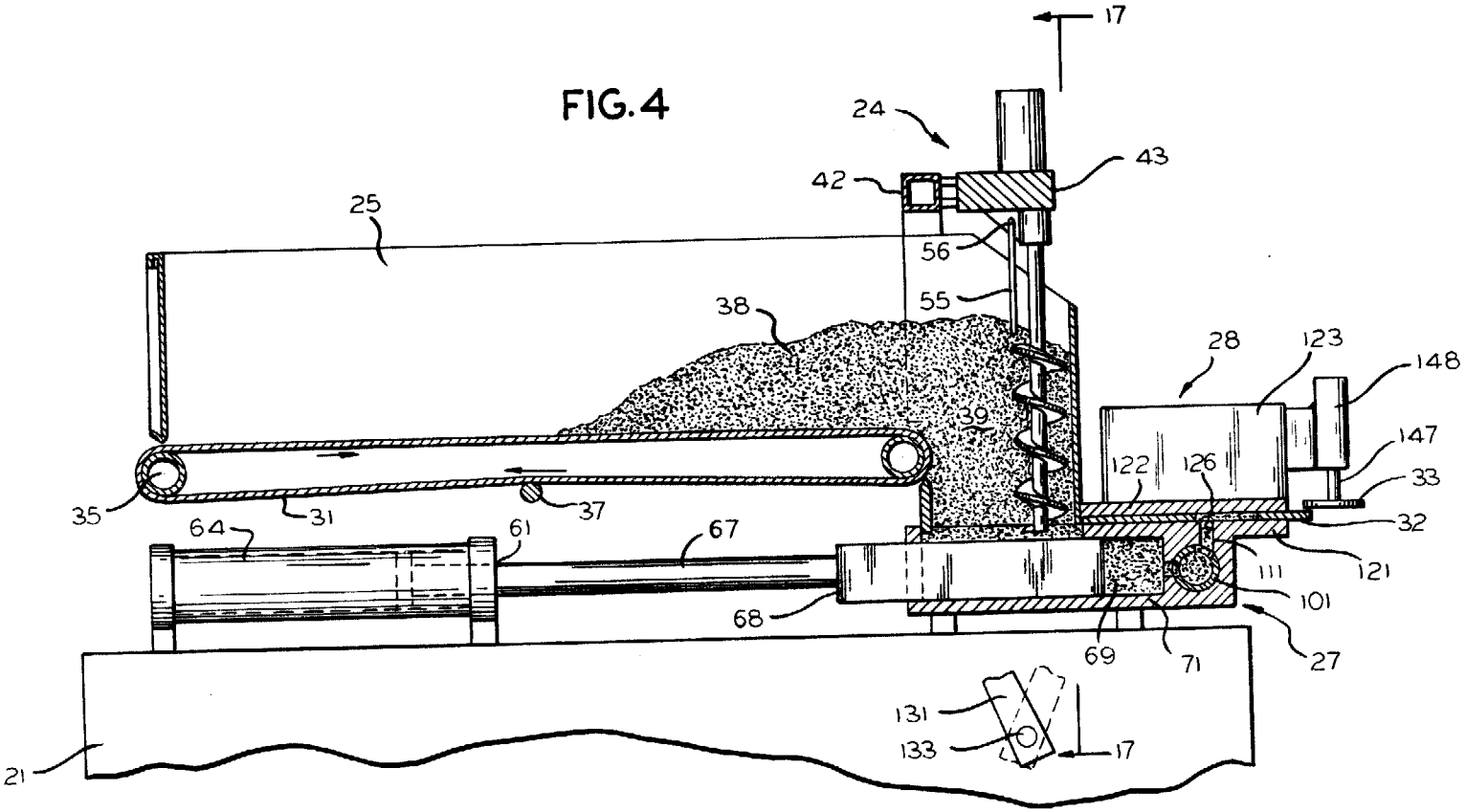
FIG. 4 is a sectional elevation view of the pumping apparatus for the food patty molding machine, taken approximately along line 4—4 of FIG. 3.
Figures 5, 5A, 6, 6A, 7, 8, 9:
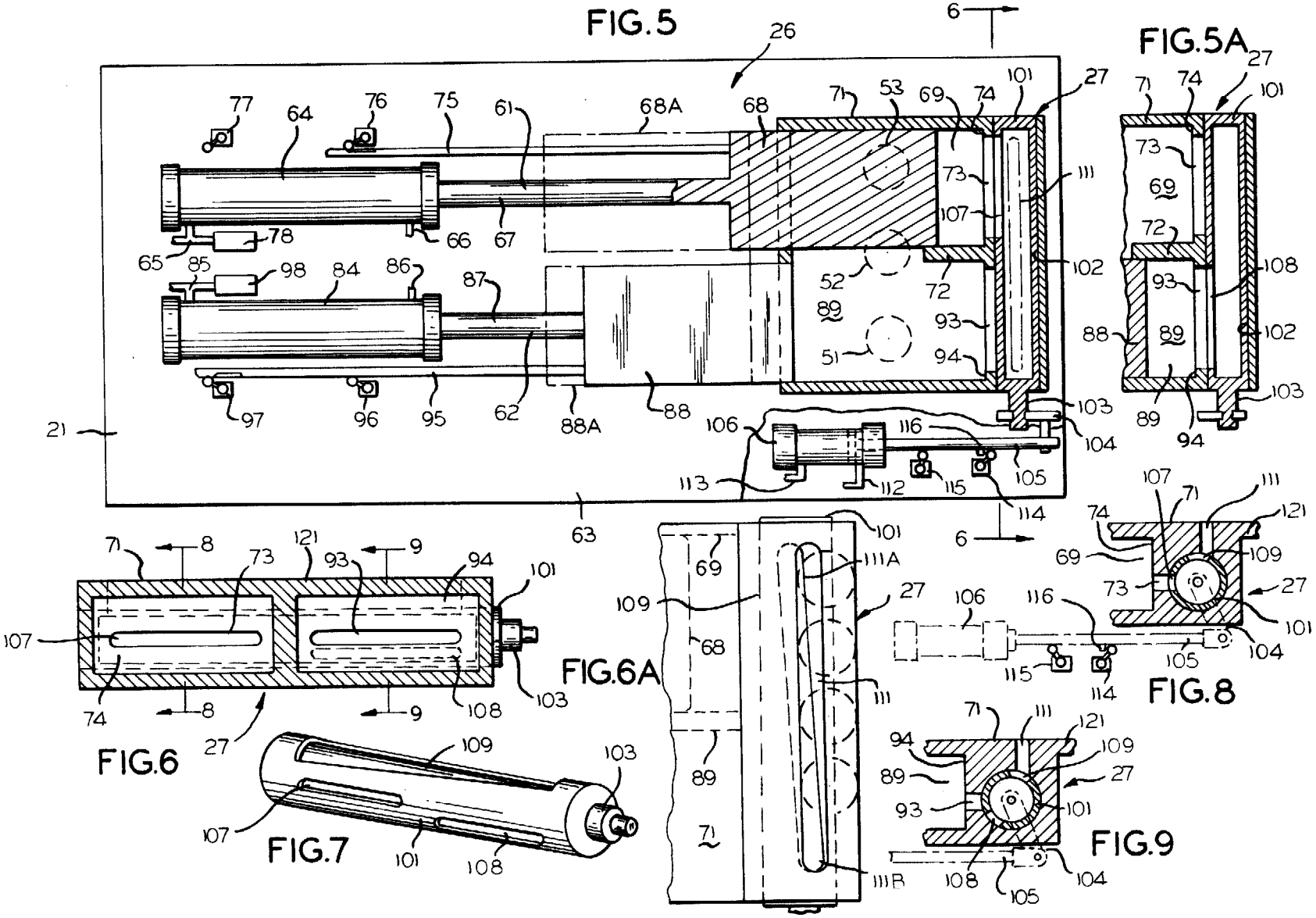
FIG. 5 is a sectional plan view of the pumping apparatus taken approximately as indicated by line 5—5 of FIG. 1.
FIG. 5A is a detail view, like a segment of FIG. 5, illustrating a change in operating condition.
FIG. 6 is a detail sectional elevation view of the pump feed manifold taken approximately as indicated by line 6—6 of FIG. 5.
FIG. 6A is a detail plan view of the pump feed manifold for the operating condition of FIG. 6.
FIG. 7 is a detail perspective view of the valve cylinder incorporated in the pump manifold.
FIGS. 8 and 9 are detail sectional views, showing one operating condition for the pump manifold, taken approximately along lines 8—8 and 9—9 in FIG. 6.
Figure 17:
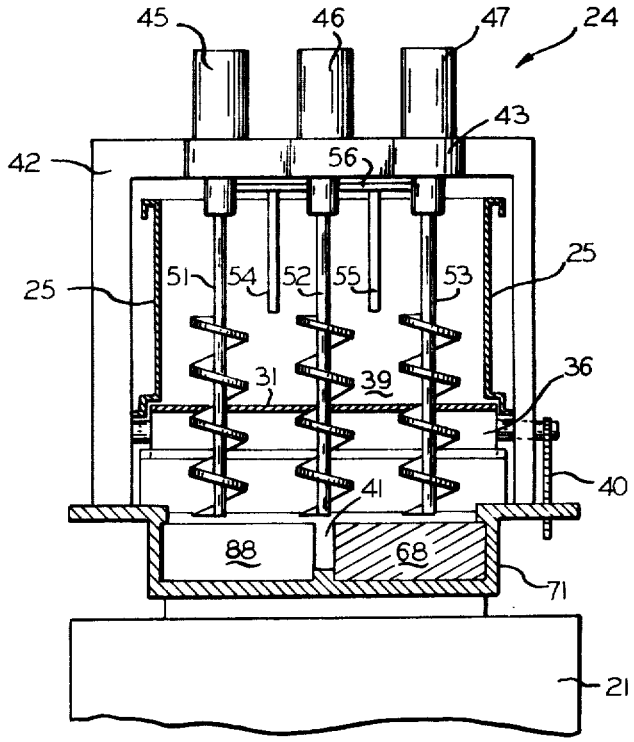
FIG. 17 is a sectional elevation, taken approximately along line 17—17 in FIG. 4, illustrating the supply apparatus for supplying moldable food material to the pumps of the patty molding machine.

THE FOOD SUPPLY MEANS (FIGS. 4, 5 and 17)

The food supply means 24 and associated hopper 25 are illustrated in FIGS. 4, 5 and 17. As seen therein, conveyor belt 31 extends completely across the bottom of hopper 25, around an end roller 35 and a drive roller 36, the lower portion of the belt being engaged by a tensioning idler roll 37. A chain drive 40 (FIG. 17) is provided for drive roller 36, driven by an electric motor (not shown). In FIG. 4 a limited supply of meat 38 is shown present in hopper 25. A much greater supply of meat could be stored in hopper 25 without exceeding its capacity.

The forward end of hopper 25 communicates with a vertical pump feed opening 39 that leads downwardly into a pump intake chamber 41 (FIGS. 4, 17). A U-shaped frame 42 is mounted on machine base 21, extending over hopper 25 adjacent the lefthand side of the hopper outlet 39 (FIG. 4). A mounting bracket 43 is affixed to the upper portion of frame 42, extending over the pump feed opening 39 in hopper 25.

As shown in FIG. 17, three electric feed screw motors 45, 46 and 47 are mounted upon bracket 43; gearmotors are preferably employed. Motor 45 drives a feed screw 51 that extends downwardly through opening 39 in alignment with a pump plunger 88. Motor 46 drives a centrally located feed screw 52, whereas motor 47 drives a third feed screw 53, located at the opposite side of hopper 25 from screw 51 and aligned with another pump plunger 68.

A level sensing mechanism is located at the outlet end of hopper 25 and comprises a pair of elongated sensing elements 54, 55 extending downwardly from a shaft 56. As the moldable food material 38 is moved forwardly in the hopper 25 (FIG. 4), it may accumulate to a level at which it engages the depending sensing fingers 54 and 55. When this occurs, shaft 56 is rotated and actuates a limit switch to interrupt the drive for roller 36 of conveyor 31. In this manner the accumulation of meat or other food material at the outlet end 39 of hopper 25 is maintained at a safe level.

When machine 20 is in operation, the feed screw motors 45 and 46 are energized whenever plunger 88 is withdrawn to the position shown in FIG. 5, so that feed screws 51 and 52 supply meat from hopper 25 downwardly through opening 39 and into one side of the intake 41 of the food pumping system 26. Similarly, motors 46 and 47 actuate feed screws 52 and 53 to feed meat to the other side of intake 41 whenever plunger 68 is withdrawn. In each instance, the feed screw motors are timed to shut off shortly after the plunger is fully retracted, avoiding excessive agitation of the meat. As the supply of food material in the outlet 39 of hopper 25 is depleted, conveyor belt 31 continuously moves the food forwardly in the hopper and into position to be engaged by feed screws 51–53. If the level of meat at the outlet end 39 of hopper 25 becomes excessive, conveyor 31 is stopped, as described above, until the supply at the hopper outlet is again depleted. The wall of the hopper outlet 39 immediately below conveyor drive roller 36 comprises a belt wiper blade 57 that continuously engages the surface of belt 31 and prevents leakage of the meat or other food material 38 from the hopper at this point.

THE FOOD PUMP SYSTEM (FIGS. 4, 5, 5A and 6)

The food pump system 26 of molding machine 20 is best illustrated in FIGS. 4 and 5. As shown therein pump system 26 comprises two reciprocating food pumps 61 and 62 mounted upon the top 63 of machine base 21. The first food pump 61 includes a hydraulic cylinder 64 having two ports 65 and 66. The piston in cylinder 64 (not shown) is connected to an elongated piston rod 67; the outer end of piston rod 67 is connected to a large plunger 68. Plunger 68 is aligned with a first pump cavity 69 formed by a pump cavity enclosure 71 that is divided into two chambers by a partial central divider wall 72. The forward wall 74 of pump cavity 69 has a relatively narrow slot 73 (FIGS. 5 and 6) that communicates with the pump manifold 27 as described more fully hereinafter.

The second food pump 62 is essentially similar in construction to pump 61 and comprises a hydraulic cylinder 84 having ports 85 and 86. Cylinder 84 has an elongated piston rod 87 connected to a massive plunger 88 that is aligned with a second pump cavity 89 in housing 71. The forward wall 94 of pump cavity 89 includes a narrow elongated slot 93 (FIGS. 5 and 6) communicating with manifold 27.

An elongated control rod 75 is affixed to the first pump plunger 68 and extends parallel to piston rod 67 into alignment with a pair of limit switches 76 and 77. A similar control rod 95 is fixed to and projects from plunger 88, parallel to piston rod 87, in alignment with a pair of limit switches 96 and 97. Limit switches 76, 77, 96 and 97 comprise a part of the control for the two pumps 61 and 62, and are discussed more fully hereinafter in connection with FIG. 18.

In FIGS. 4 and 5, the pumping system 26 is illustrated with the first pump 61 pumping the moldable food material into manifold 27 and with the second pump 62 receiving a supply of the moldable food material for a subsequent pumping operation. Pump 61 has just begun its pumping stroke, and has compressed the food product in pump cavity 69, forcing the moldable food material through slot 73 into manifold 27. As operation of molding machine 20 continues, pump 61 advances plunger 68 to compensate for the removal of food material through manifold 27, maintaining a relatively constant pressure on the remaining food in chamber 69.

As plunger 68 advances, the corresponding movement of control rod 75 ultimately trips limit switch 76, indicating that plunger 68 is near the end of its permitted range of travel. When this occurs, pump 62 is actuated to advance plunger 88 through pump cavity 89, compressing the food material in the second pump cavity in preparation for feeding the food from that cavity into manifold 27. The pressure applied through pump 62 is sensed by a pressure sensing switch 98 connected to one port 85 of cylinder 84; a similar pressure sensing switch 78 is incorporated in pump 61, being connected to port 65 of cylinder 64. When the food in the second pump cavity 89 is under adequate pressure, the input to manifold 27 is modified to the condition shown in FIG. 5A, so that subsequent feeding of food product to the manifold is effected from the second pump cavity 89 with continuing advancement of plunger 88 of the second pump 62. After the manifold intake has been changed over, pump 61 is actuated to withdraw plunger 68 from cavity 69.

Thereafter, when plunger 88 nears the end of its pressure stroke into pump cavity 89, limit switch 96 is tripped, signaling the need to transfer pumping operations to pump 61. The changeover process described immediately above is reversed; pump 61 begins its compression stroke, manifold 27 is changed over for intake from pump 61, and pump 62 subsequently retracts plunger 88 back to the supply position shown in FIG. 5 to allow a refill of pump cavity 89. This overlapping alternating operation of the two pumps 61 and 62 continues as long as molding machine 20 is in operation.

Pump cylinders 64 and 84 can also be actuated to retract the two pump plungers 66 and 88 further to cleaning positions 68A and 88A respectively. When in the cleaning position 68A and 88A, the two plungers are completely exposed and can be thoroughly cleaned with little or no difficulty. In addition, retraction of the plungers to cleaning position affords convenient access to the pump cavities 69 and 89 to assure effective cleaning of this part of pump system 26.

THE PUMP FEED MANIFOLD AND VALVE SYSTEM (FIGS. 5 THROUGH 12)

The pump feed manifold 27, shown in FIGS. 5–12, comprises a manifold valve cylinder 101 fitted into an opening 102 in housing 71 immediately beyond the pump cavity walls 74 and 94. One end wall of valve cylinder 101 includes an externally projecting shaft 103 connected to a drive link 104, in turn connected to the end of the piston rod 105 of a hydraulic actuator cylinder 106. Actuator 106 has two fluid ports 12 and 13. Two sensing switches 114 and 115 are positioned adjacent piston rod 105 in position to be engaged by a lug 116 on the piston rod.

Valve cylinder 101 includes two longitudinally displaced intake slots 107 and 108 alignable with the outlet slots 73 and 93, respectively, in the pump cavity walls 74 and 94. However, slots 107 and 108 are angularly displaced from each other to preclude simultaneous communication between the manifold and both pump cavities 69 and 89. Cylinder 101 also includes an elongated outlet slot 109. Outlet slot 109 is angularly skewed, longitudinally of cylinder 101, to control the outlet pressure from manifold 27 to molding mechanism 28, as explained hereinafter. The valve cylinder outlet slot 109 is generally aligned with a slot 111 in housing 71 that constitutes a feed passage for molding mechanism 28 (see FIGS. 6A, 8, 9, 10A, 11 and 12). The outer end of cylinder 101 is covered by a valve guard 110 (FIGS. 2, 3).

FIGS. 5, 6, 6A, 8 and 9 illustrate the operating condition maintained for manifold 27 whenever pump 61 is supplying food material under pressure to molding mechanism 28. Actuator cylinder 106 has advanced piston rod 105 to the outer limit of its travel, angularly orienting the manifold valve cylinder 101 as shown in these figures. With cylinder 101 in this position, its intake slot 107 is aligned with the outlet slot 73 from pump cavity 69 so that food material is forced under pressure from cavity 69 through the interior of valve cylinder 101 and out of the valve cylinder outlet slot 109 through slot 111 to the molding mechanism 27. On the other hand, the second intake slot 108 of valve cylinder 101 is displaced from the outlet slot 93 for the second pump cavity 89. Consequently, the food material forced into the interior of valve cylinder 101 from pump cavity 69 cannot flow back into the other pump cavity 89.

The alignment of the cylinder outlet slot 109 and the manifold outlet slot 111 for this operating condition is shown in FIG. 6A. As shown therein, the end 111A of slot 111 adjacent pump cavity 69 is only narrowly open to communication with the angularly displaced valve cylinder outlet slot 109. The opposite end 111B of slot 111 is fully open to slot 109. Communication between the two slots 109 and 111 varies progressively from one end to the other. The slot restriction at end 111A is affected because this is the point of least resistance to flow of food material from pump chamber 69 to molding mechanism 28. The much wider slot opening at end 111B is utilized to compensate for the greater length of pump feed, and hence greater resistance, in filling mold cavities at end 111B from pump cavity 69.

Figure 10:
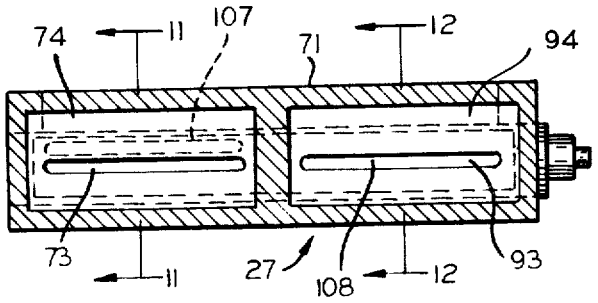
FIG. 10 is a view like FIG. 6, but showing the pump manifold in a different operating condition.
Figure 11:
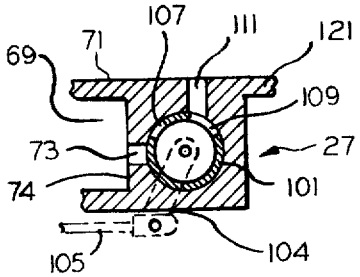
FIGS. 11 and 12 are detail sectional views taken approximately along lines 11—11 and 12—12 in FIG. 10.
Figure 12:
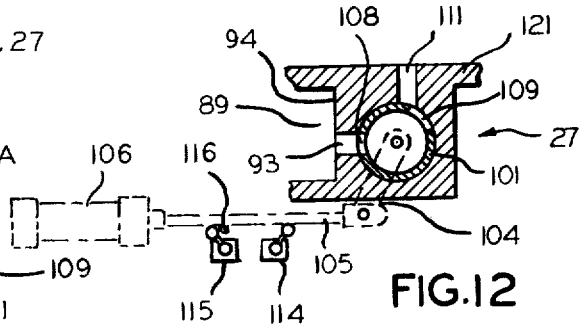

When molding machine 20 changes over from pump 61 to pump 62 (FIGS. 5 to 5A), manifold 27 is actuated to its alternate operating condition as illustrated in FIGS. 10-12. This is accomplished by actuator 106, which retracts piston rod 105 to the piston shown in FIG. 12 and rotates valve cylinder 101 through a limited angle in a clockwise direction from the positions illustrated in FIGS. 8 and 9 from those shown in FIGS. 11 and 12.

In this alternate operating condition, intake slot 107 of cylinder 101 is displaced from the first pump cavity outlet slot 73 (FIGS. 10 and 11) so that food material can no longer flow into or out of cylinder 101 from pump cavity 69. On the other hand, the other intake slot 108 of cylinder 101 is now aligned with the outlet slot 93 from pump cavity 89, so that food material is forced under pressure through slots 93 and 108 into the interior of cylinder 101 and out of the cylinder through slots 109 and 111 to the molding mechanism of the machine.

Figure 10A:
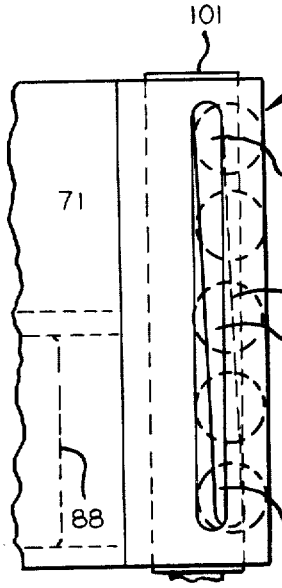
FIG. 10A is a view like FIG. 6A, but illustrating the operating condition of FIG. 10.

The alignment of slots 109 and 111 for this second operating condition, in which the food material is pumped by the second pump 62, is shown in FIG. 10A. As seen therein, the end 111A of slot 111 most remote from pump chamber 89 is wide open to compensate for the necessity of pumping food material the full length of cylinder 101 before the material is discharged to the molding mechanism. The other end 111B of the feed slot for the molding mechanism is quite restricted; this is the area of least resistance for movement of the food material. As before, the communication between slots 109 and 111 varies progressively throughout the lengths of the slots, affording effective compensation for the variations in length of food material flow path, and hence in resistance to flow, in feeding the molding mechanism.

When pumping from cavity 89 of pump 62 is subsequently terminated, and pumping is resumed from cavity 69 of pump 61 as described above, hydraulic actuator 106 again operates to extend piston rod 105. The movement of rod 105, through link 104, rotates valve cylinder 101 counterclockwise back to the position shown in FIGS. 6, 8 and 9. This restores manifold 27 to the appropriate operating condition for pumping of food material from cavity 69 to the molding mechanism of the machine.

THE MOLDING MECHANISM FIGS. 2-4 AND 13 THROUGH 16

The basic molding mechanism 28 of molding machine 20 is generally conventional in many respects, but incorporates unusual structural features utilized for rapid change-over of the mold plate and for effective and efficient cleaning of the molding mechanism. FIGS. 13 through 16 illustrate the structural features of the invention provided for these purposes, omitting some of the more conventional parts of the mechanism that are not necessary to an understanding of the inventive construction.

The upper surface of the housing 71 that encloses the pump cavities 69 and 89 and the manifold 27 comprises a support plate 121 that projects forwardly of the housing, and that affords a flat, smooth mold plate support surface. The mold plate support 121 may be fabricated as a separate plate bolted to or otherwise fixedly mounted upon housing 71. It includes the upper portion of the manifold outlet passage 111, as shown in FIGS. 8, 9, 11 and 12.

Figure 14:
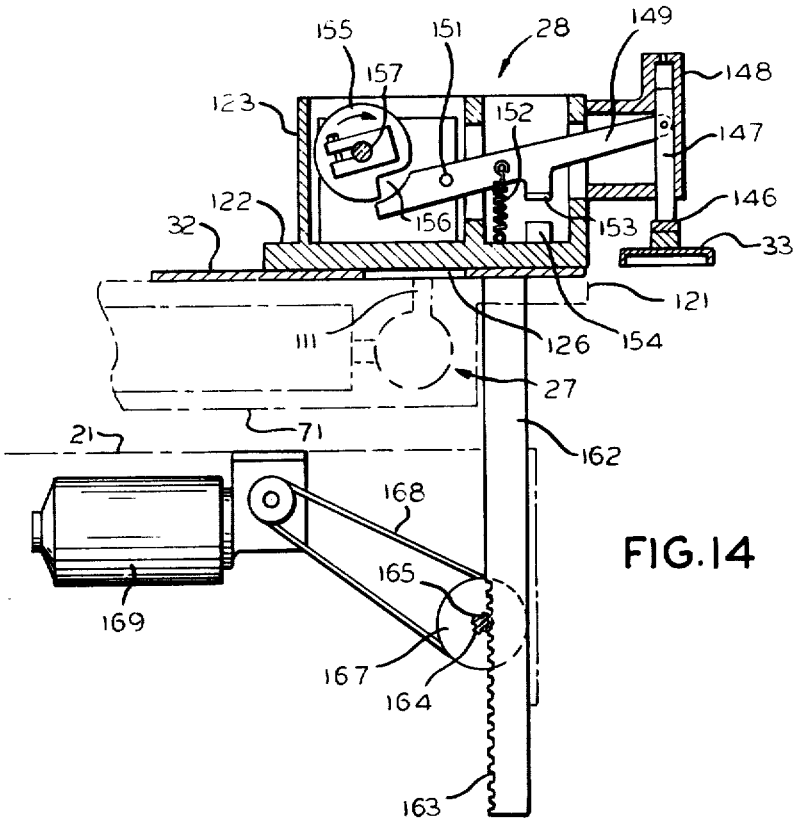
FIG. 14 is a sectional elevation view of the knockout drive and a part of the mounting apparatus for the molding mechanism of the patty molding machine.

Mold plate 32 is supported upon plate 121. Mold plate 32 includes a plurality of individual mold cavities 126 extending across the width of the mold plate and alignable with the manifold outlet passageway 111, as shown in FIG. 14. A cover plate 122 is disposed immediately above mold plate 32, closing off the top of each of the mold cavities 126. A housing 123 is mounted upon cover plate 122. The spacing between cover plate 122 and support plate 121 is maintained equal to the thickness of mold plate 32 by support spacers 124 mounted upon support plate 121; cover plate 122 rests upon spacers 124 when the molding mechanism is assembled for operation, as shown in FIG. 3. Cover plate 122 is held in place by four mounting bolts 125 (FIGS. 2, 4, 16).

Mold plate 32 is connected to a drive rod 128 (FIG. 13) that extends alongside housing 71 and is connected at one end to a swing link 129. The other end of link 129 is pivotally connected to a rocker arm 131 which, with a second arm 132, forms a crank pivoted on a fixed shaft 133. The free end of crank arm 132 is provided with a lost motion connection, entailing a pin 134 in an elongated slot 135, to a connecting rod assembly 136 that includes a hydraulic shock absorber 137. Shock absorber 137 is connected to a mold plate crank arm 138 having a crank pin 139 linked to the output shaft 141 of a gear reducer 142. Gear reducer 142 is driven through a variable speed drive, represented in FIG. 13 by a pulley 143, actuated by a mold plate drive motor (not shown).

Figure 15:
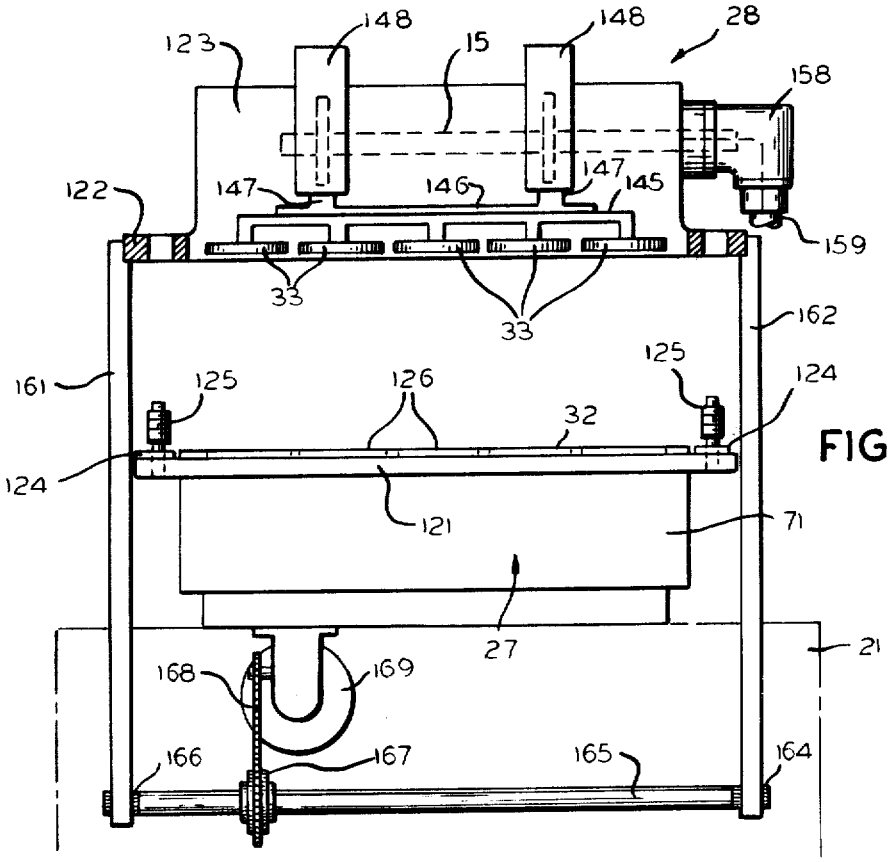
FIG. 15 is a detail view, partly in cross section, of a part of the molding mechanism in a position utilized during change of a mold plate.
Figure 16:
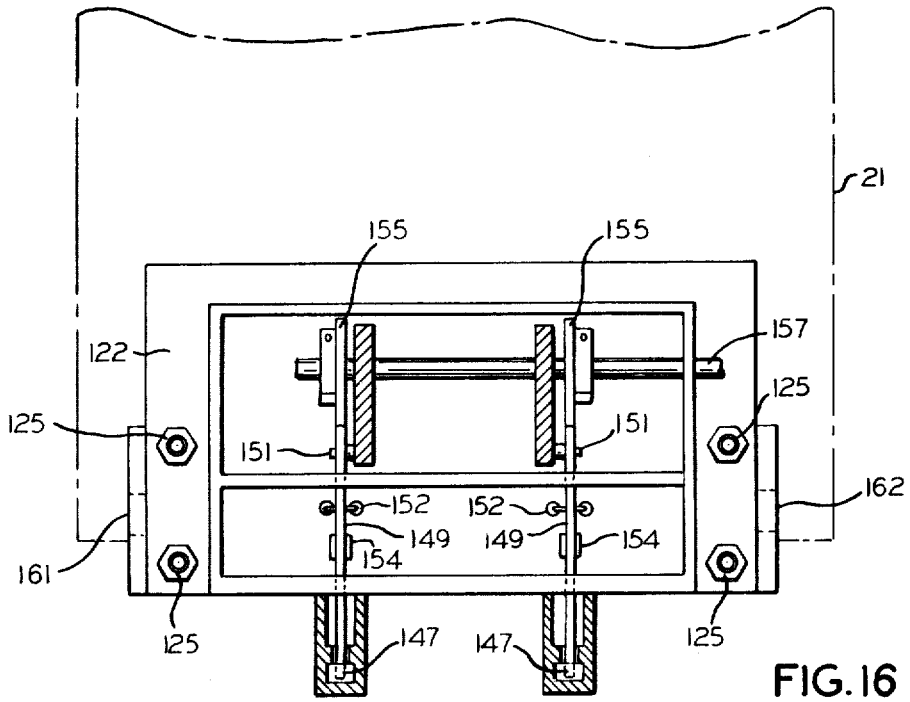
FIG. 16 is a detail plan view, partly in cross section, of the molding mechanism.

Molding mechanism 28 further comprises a knockout apparatus shown in FIGS. 14, 15 and 16. The knockout apparatus comprises the knockout cups 33, which are affixed to a carrier bar 145 that is removably mounted upon a knockout support member 146. Knockout cups 33 are coordinated in number and size to the mold cavities 126 in mold plate 32; there is one knockout cup 33 aligned with each mold cavity 126 and the mold cavity size is somewhat greater than the size of an individual knockout cup.

Knockout support member 146 is carried by two knockout rods 147. Each knockout rod 147 is disposed in an individual housing 148 and is pivotally connected to its own knockout rocker arm 149 (FIGS. 14 and 15).

As shown in FIGS. 14 and 16, each knockout rocker arm is pivotally mounted upon a shaft 151. There a pair of springs 152 are connected to each knockout rocker arm 149, biasing the arm toward movement in a clockwise direction as seen in FIG. 14. Clockwise movement of each rocker arm 149 is limited by a stop 153 aligned with a bumper 154 mounted in housing 123.

Each rocker arm 149 is normally restrained against counterclockwise movement by engagement with a knockout cam 155 (FIGS. 14, 16); the two cams 155 each have a notch 156 aligned with the corresponding notch on the other cam. Cams 155 are affixed to a knockout cam shaft 157. Shaft 157 extends across housing 123 to a right angle drive connection 158 leading to a knockout cam drive shaft 159 (FIG. 15) that has a driving connection (not shown) to the mold plate drive gear reducer output shaft 141 (FIG. 13).

Two cover lift bars 161 and 162 are affixed to cover plate 122 on opposite sides of the machine (FIGS. 14–16) and extend downwardly into machine base 21. As shown in FIG. 14, the lower end of lift bar 162 comprises a rack 163 that engages a pinion 164 on one end of a shaft 165. Lift bar 161 comprises a similar rack engaging a pinion 166 on the opposite end of shaft 165. Shaft 165 carries a sprocket 167 engaged by a chain 168 driven from a reversing mold cover lift motor 169, which is preferably a gear motor.

Figure 13:
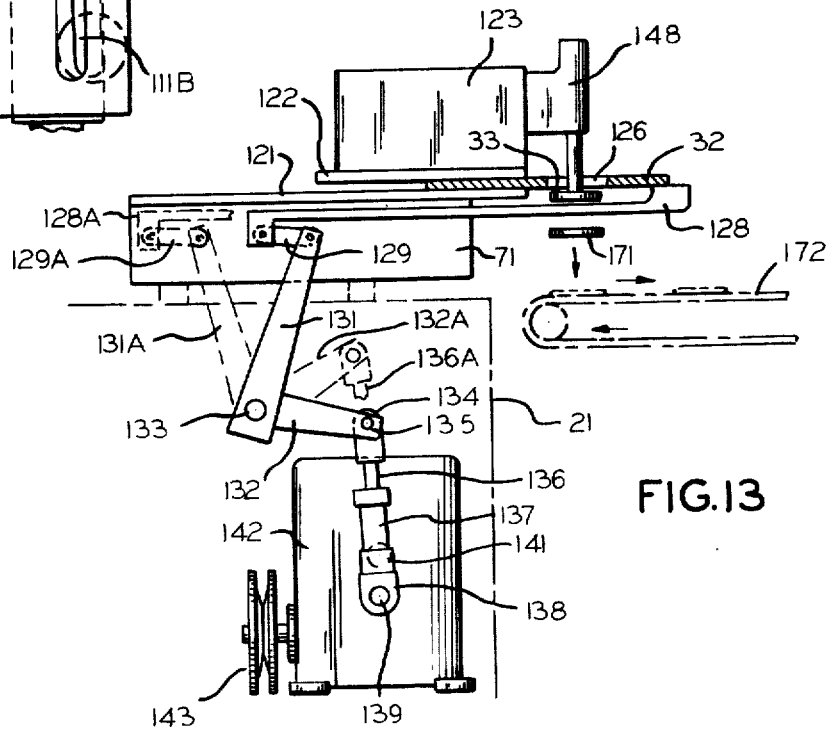
FIG. 13 is a simplified elevation view illustrating the drive for the molding mechanism of the patty molding machine.

During a molding operation the molding mechanism 128 is assembled as shown in FIGS. 13 and 14, with cover plate 122 tightly clamped onto spacers 124 as illustrated in FIG. 3. Gear reducer 142 (FIG. 13) is continuously driven through pulley 143.

Starting from the position shown in FIG. 13, in each cycle of operation, knockout cups 33 are first withdrawn to the position shown in FIG. 14, cams 155 pivoting knockout rocker arms 149 to their elevated positions to lift the knockout cups. The drive linkage from gear reducer 142 to mold plate 32 (FIG. 13) then slides the mold plate from the full extended position shown in FIG. 13 to the mold filling position illustrated in FIGS. 4 and 14, with the mold cavities 126 aligned with passageway 111.

In the retracted cavity filling position for mold plate 32, drive rod 128 is in the dash line position 128A, FIG. 13; the other drive components are in the positions indicated by swing link 129A, crank arms 131A and 132A, and connecting rod 136A. The lost motion connections in the drive linkage assure some dwell time at the discharge or knockout position (FIG. 13) of mold plate 32, so that the knockout cups 33 have time to enter and leave the mold cavities 126 while mold plate 32 is at rest. Some dwell at the cavity filling position may also be provided. Hydraulic cushion 137 allows crank 131 to pick up the mold plate load over several degrees of rotation, gradually overcoming the mold plate inertia. The lost motion connections and the hydraulic cushion 137 incorporated in the drive linkage for the mold plate thus reduce wear and tear on both the mold plate and its drive, assuring long life and minimum maintenance.

During most of each cycle of operation of mold plate 32, the knockout mechanism illustrated in FIGS. 14–16 remains in the elevated position, FIG. 14, with knockout cups 33 clear of mold plate 32. When mold plate 32 reaches its extended discharge position as shown in FIG. 13, however, the notches 156 in the cams 155 are brought into alignment with the knockout rocker arms 149 (FIG. 14). Synchronism is maintained between cams 155 and mold plate 32 because knockout cam shaft 157 is driven directly from the same gear reducer 142 that drives the mold plate. At this point in the molding cycle, the two knockout rocker arms 149 are pulled rapidly downwardly by the springs 152, pivoting the two rocker arms in a clockwise direction. This movement of the rocker arms drives the knockout rods 147 downwardly, moving the knockout cups 33 through the mold cavities 126 to discharge molded food patties, such as the patty 171, from the mold plate 32 (see FIG. 13). The discharged patties may be picked up by a conveyor 172 or may be accumulated in a stacker. If desired, the discharged patties may be interleaved with paper, by an appropriate paper interleaving device. In fact, machine 20 may be used with a wide variety of secondary equipment, including steak folders, bird rollers, and other such equipment.

To change mold plate 32 or to clean molding mechanism 28, the retaining nuts on mounting bolts 125 are removed. Motor 169 is then energized, rotating shaft 165 in a counterclockwise direction as seen in FIG. 14. This raises the two lift bars 161 and 162 simultaneously and lifts cover plate 122 and the entire knockout mechanism to the position shown in FIG. 15, displaced well above mold plate 32. When this has been done, it is a simple matter to remove mold plate 32 for cleaning or replacement. If a different mold plate is installed in the machine entailing a different number of mold cavities 126, the knockout cup assembly comprising cups 33 and carrier 145 is also removed and a new knockout cup assembly coordinated to the new mold plate is installed. When cleaning or modification of the mold plate and knockout assembly are completed, motor 169 is again energized for rotation in the opposite direction, lowering the knockout mechanism and cover plate 122 to their normal operative position. The retaining nuts are re-installed on bolts 125 and machine 20 is again ready for operation.

HYDRAULIC ACTUATION SYSTEM AND OVERALL SEQUENCE OF OPERATION (FIG. 18)

Figure 18:
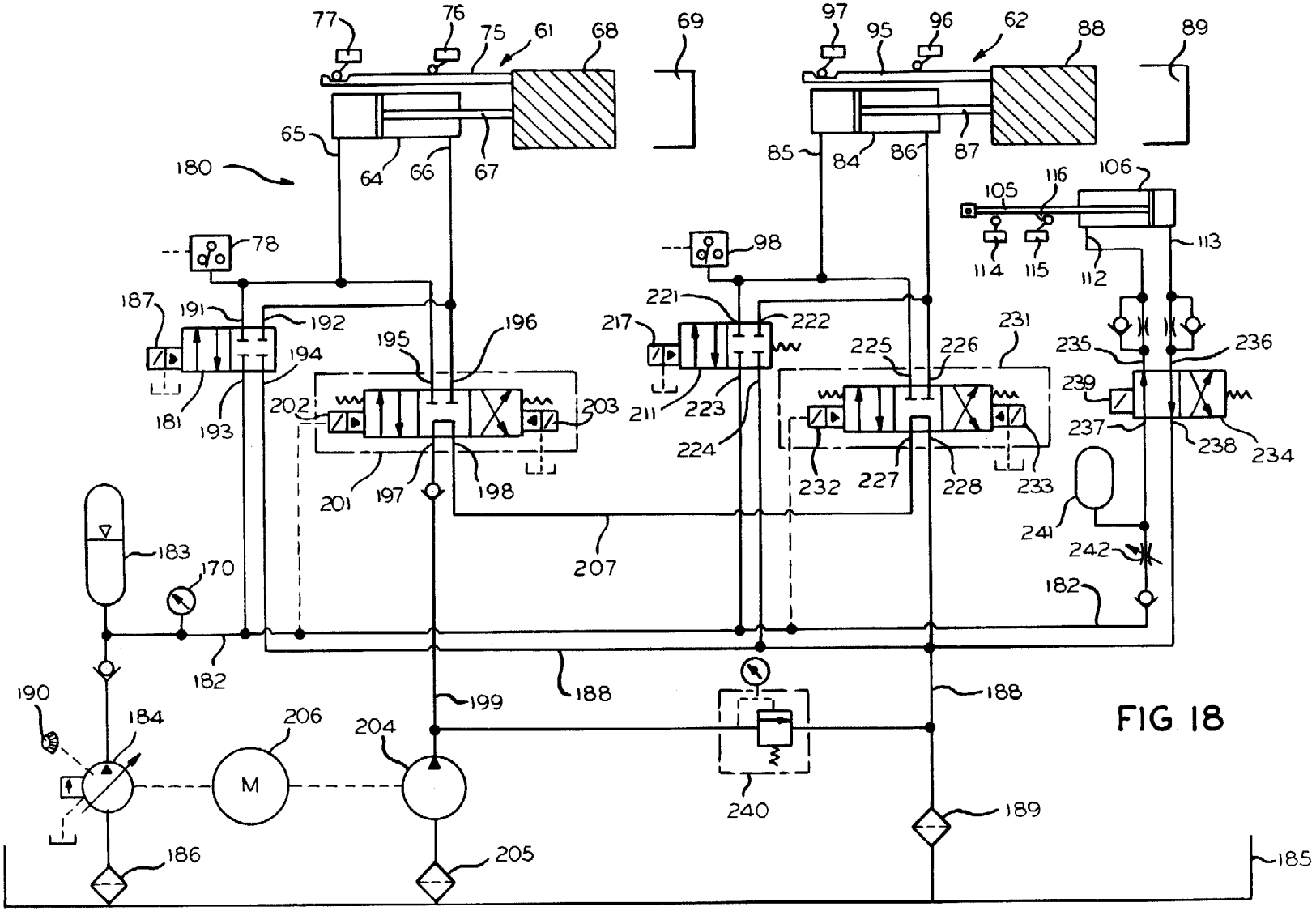
FIG. 18 is a schematic diagram of the hydraulic actuating system employed in operation of the patty molding machine.

FIG. 18 affords a schematic illustration of a preferred form of hydraulic actuator system 180 for the food pumps and the manifold of patty molding machine 20; system 180 also provides a basis for description of a typical pump-manifold operating sequence. In system 180, port 65 of cylinder 64 in the first food pump 61 is connected to one port 191 of a two-position control valve 181. Port 66 of cylinder 64 is connected to a second port 192 of valve 181. A third port 193 of valve 181 is connected to a high pressure oil line 182 that is connected to an accumulator 183 and to a high-pressure hydraulic pump 184. Pump 184 draws hydraulic fluid from a tank 185 through an appropriate filter 186. Valve 181 is actuated by a solenoid 187. The remaining port 194 of valve 181 is connected to a drain line 188 that is returned to tank 185 through a filter 189.

Port 65 of pump cylinder 64 is also connected to one port 195 of a three-position control valve 201, with port 66 of cylinder 64 connected to a second port 196 of valve 201. Valve 201 is a three-position control valve actuated by two solenoids 202 and 203. It includes a third port 197 connected to a hydraulic line 199 that is fed from the outlet of a low pressure hydraulic pump 204 having an intake connected to tank 185 through a filter 205. The pumps 184 and 204 are driven by a single electric motor 206. The remaining port 198 of valve 201 is connected to a hydraulic line 207.

The controls for cylinder 84 of the second food material pump 62 are essentially identical to those of cylinder 64. Thus, port 85 of cylinder 84 is connected to one port 221 of a two-position control valve 211 actuated by a solenoid 217. Port 86 of cylinder 84 is connected to a second port 222 of valve 211. The third port 223 of valve 211 is connected to the high pressure hydraulic line 182 and the fourth port 224 of control valve 211 is connected to the drain line 188.

Port 85 of the second pump cylinder 84 is connected to the first port 225 of a three-position control valve 231. Port 86 of cylinder 84 is connected to a second port 226 of valve 231. The third port 227 of valve 231 is connected to line 207 and the fourth port 228 is connected to drain line 188. Valve 231 is actuated by two solenoids 232 and 233.

Port 112 of the manifold actuator cylinder 106 is connected to one port 235 of a two-position control valve 234; port 113 of cylinder 106 is connected to a second port 236 of the same valve. The third port 237 of control valve 234 is connected to the high pressure hydraulic line 182. The fourth port 238 of valve 234 is connected to drain line 188. Valve 234 is actuated by a solenoid 239. A pressure relief valve 240 may be connected between the low pressure hydraulic supply line 199 and the drain line 188. An auxiliary accumulator 241 and variable restriction 242 are connected to the high pressure line 182 near actuator cylinder 106.

In considering operation of patty molding machine 20, using the hydraulic actuation and control system 180 of FIG. 18, it may be assumed at the start that the two piston rods 67 and 87 are fully retracted with the plungers 68 and 88 in their respective cleaning positions 68A and 88A, (FIG. 5) and that cylinder 106 is fully retracted as shown in FIG. 18. In these circumstances, motor 206 is energized, starting both high pressure pump 184 and low pressure pump 204. High pressure oil is accumulated in accumulators 183 and 241 and is supplied to port 112 of actuator cylinder 106. This assures a start-up of machine 20 with cylinder 106 in its fully retracted position and with manifold 27 in the operating condition illustrated in FIGS. 10–12.

After a limited period of time, sufficient to allow a build-up of an adequate volume of hydraulic fluid under pressure in the two accumulators 183 and 241, the machine operator actuates a suitable electric control (not shown) to energize solenoids 202 and 232. This alters the porting arrangements for both of the valves 201 and 231, so that low pressure oil is supplied from line 199 to port 65 of cylinder 64, advancing piston rod 67 and plunger 68 a short distance until control rod 75 trips limit switch 77. At the same time, oil under low pressure is supplied, through line 207 and control valve 231, to port 85 of the second pump cylinder 84, which advances piston rod 87 and plunger 88 until limit switch 97 is tripped by control rod 95. The tripping of switches 77 and 97 de-energizes solenoids 202 and 232, allowing control valves 201 and 231 to return to their initial operating conditions and interrupting the supply of fluid to the pump cylinder ports 65 and 85. The plungers 68 and 88 are stopped side-by-side in their respective ready positions, corresponding to the position of plunger 88 in FIG. 5, with the leading edge of each plunger just inside pump housing 71.

The machine operator next starts the sequential operation of machine 20 by actuating an appropriate electrical control to energize solenoid 202, again supplying low pressure fluid from line 199, through ports 197 and 195 of control valve 201, to port 65 of cylinder 64 in the first food pump 61. As a consequence, piston rod 67 and plunger 68 are advanced, pushing food material into the first pump cavity 69. After a short period of time, plunger 68 stalls against the food material trapped in cavity 69; as a result, pressure builds up in the portion of cylinder 64 connected to port 65. This build-up of fluid pressure trips the pressure-sensitive switch 78.

When switch 78 is tripped, solenoid 187 is energized and solenoid 202 is de-energized. Control valve 201 returns to its original operating condition, cutting off the low-pressure fluid supply to port 65 of cylinder 64. However, control valve 181 is to connect the high pressure hydraulic fluid line 182 to port 65 of cylinder 64. In addition, the actuation of the pressure sensing switch 78 is utilized to initiate energization of solenoid 239 of control valve 234. This reverses the inlet and drain connections for actuator cylinder 106, connecting port 113 to the high pressure line 182 and connecting port 112 to the drain line 188. Actuator cylinder 106 rapidly advances piston rod 105 to the position shown in FIGS. 5–9, conditioning manifold 27 to feed food material from the first pump cavity 69 to the molding mechanism 28. Plunger 68, under compression, forces food material through the aligned ports of manifold 27 and fills the manifold outlet passageway 111 with food material under relatively high pressure. This action continues until plunger 68 stalls against the food material trapped in pump cavity 69 and in manifold 27, a condition which is reached in a short time.

Molding mechanism 28 now begins its sequential cyclic operation. Each time mold plate 32 comes into alignment with the manifold outlet passageway 111, filling mold cavities 126, as described in detail above, plunger 68 jogs forward by a short distance, pushing additional food material forwardly in cavity 69, into manifold 27, and into the cavities of the mold plate, and then again stalls against the trapped food material. In this manner, plunger 68 of food pump 61 jogs or "jumps" forwardly into cavity 69 each time the mold cavities are filled anew.

As plunger 68 moves into cavity 69, after several cycles of the molding mechanism, limit switch 76 is tripped by control rod 75, signalling that plunger 68 is near the end of its stroke and that only a minimal amount of food material remains in cavity 69. The actuation of switch 76 energizes solenoid 232 to shift control valve 231 and apply low pressure fluid from line 199, through line 207, to port 85 in the second pump cylinder 84. As a consequence, plunger 88 is advanced, pushing food material into the second pump cavity 89. After a short time, plunger 88 stalls against the food material trapped in cavity 89, so that the oil pressure in the portion of cylinder 84 connected to port 85 builds up and trips the pressure-sensitive switch 98.

When switch 98 is tripped, solenoid 217 is energized to actuate control valve 211 and solenoid 232 is de-energized, permitting control valve 231 to return to its original operating condition. Under these circumstances, port 85 of pump cylinder 84 is connected to the high pressure line 182 and port 86 is connected to the drain line 188. Accordingly, the food material in cavity 89 is placed under high pressure.

At this point, the two pressure sensitive switches 78 and 98 have both been tripped; this is the signal for actuation of manifold 27 to its alternate operating condition to feed molding mechanism 28 from the second pump cavity 89. Solenoid 239 is de-energized, allowing valve 234 to return to its original operating condition as shown in FIG. 18, with oil supplied under pressure to port 112 of actuator cylinder 106 and with port 113 connected to drain line 188. Consequently, piston rod 106 is rapidly retracted and the manifold valve cylinder 101 is rotated to the alternate manifold operating condition illustrated in FIGS. 10–12. Food material can now be pushed into the mold plate cavities by plunger 88 moving into cavity 89.

If it happens that the mold plate cavities 126 are aligned with the manifold outlet passageway 111 at the time valve cylinder 101 is rotated to change over from pump 61 to pump 62, the mold cavities will be filled with food material flowing from both of the pump cavities 69 and 89. It should be noted that switch 76 must be tripped soon enough to allow plunger 88 to advance and build up a high pressure in cavity 89, and also to allow a changeover in the position of manifold valve cylinder 101 to take over filling of the mold cavities from pump cavity 89, before plunger 68 reaches the end of its stroke, so there will be no interruption in the operation of molding mechanism 28.

When the changeover of manifold 27 has been completed, by rotation of valve cylinder 101 to the position shown in FIGS. 10–12, the outlet slot 73 from pump cavity 69 is blocked. Accordingly, plunger 68 can now be retracted to obtain a new supply of material. The completion of changeover operation in the position of the manifold valve cylinder is signalled by tripping of limit switch 115; actuation of switch 115 de-energizes solenoid 187 and permits control valve 181 to return to its original position as shown in FIG. 18. This disconnects the high pressure supply line 182 from port 65 of cylinder 64 in the first food pump 61. The pressure sensing switch 78 drops out. Solenoid 203 is energized, shifting control valve 201 to its third operating position and connecting the low pressure supply line 199 to port 66 of cylinder 64 while port 65 is connected to drain line 188 through line 207. This retracts the piston in cylinder 64 and hence retracts piston rod 67 and plunger 68 from the pump cavity 69. Retraction of plunger 68 continues until switch 77 is tripped, de-energizing solenoid 203. This action occurs when plunger 68 reaches its ready position, just within housing 71, allowing an additional supply of food material to be fed into pump 61 by feed screw 52 and 53, which are actuated while plunger 68 retracts.

Plunger 68 remains in its ready position until plunger 88 advances by jogging or jumping to a point near the end of its travel into pump cavity 89. When plunger 88 has moved far enough to trip sensing switch 96, solenoid 202 is energized. With solenoid 202 energized, control valve 201 is positioned to supply oil from the low pressure line 199 to port 65 of pump cylinder 64, advancing plunger 68 to push a fresh supply of food material into pump cavity 69. Plunger 68 stalls against the material trapped in cavity 69, so that a build-up of oil pressure occurs behind the piston in cylinder 64 and again trips pressure switch 78 which connects the high pressure hydraulic fluid line 182 to port 65 of cylinder 64 by energizing solenoid 187.

When pressure switch 78 trips, solenoid 202 is de-energized to cut off the low pressure oil supply to cylinder 64. The two pressure switches 78 and 98 being energized, solenoid 239 is again energized to reverse the valve connections for cylinder 106, supplying high pressure oil to port 113 and connecting port 112 to drain line 188. Accordingly, piston rod 105 is again advanced and rotates valve cylinder 101 to change manifold 27 back to the operating condition shown in FIGS. 5–9. Accordingly, food material can now again be forced into the mold plate cavities, through manifold 27, by pump 61.

The changeover in manifold 27 to pump 61 again blocks the slot 93 from pump cavity 89, so that the second food pump 62 can be re-charged with food material. The changeover of the pump manifold trips sensing switch 114, which actuates an appropriate electrical control circuit to de-energize solenoid 217, allowing control valve 211 to return to its original operating condition and cutting off the high pressure oil supply to pump cylinder 84. The pressure sensing switch 98 drops out, solenoid 233 is energized, and control valve 231 is actuated to its third operating condition. Under these circumstances, low pressure oil is supplied through lines 199 and 207 to port 86 of cylinder 84 while port 85 is connected to drain line 188. Accordingly, plunger 88 is retracted to its ready position, tripping sensing switch 97. When switch 97 is tripped, solenoid 233 is de-energized and valve 231 returns to its original position, the movement of plunger 88 being halted with the plunger in its ready position as shown in FIG. 5 so that a new supply of food material can be fed directly into pump cavity 89 by feed screws 51 and 52 (see FIG. 5).

Plunger 88 waits in its ready position until plunger 68 jogs or jumps ahead to the point near the end of its travel where switch 76 is tripped. Actuation of switch 76 energizes solenoid 232 to begin a slow advance of plunger 88, thus initiating the next changeover to the second food pump 62. Operation continues in this manner, with pumps 61 and 62 working in overlapping alternation, as long as an output is desired from molding machine 20 and a continuing supply of food material is maintained in hopper 25.

The function of accumulator 241 is to minimize the pressure drop in line 182 caused by the feeding of high pressure oil to cylinder 106. This is desirable in maintaining uniformity in the pressure at which the mold cavities are filled just after cylinder 106 shifts. Restriction 242 limits the flow of oil to replenish accumulator 241, minimizing the pressure drop.

The electrical control for machine 20 is preferably arranged so that, when the machine is stopped, solenoid 239 is de-energized. Thus, whenever the machine is stopped, high pressure oil is supplied to port 112 of actuator cylinder 116, retracting piston rod 105. In this manner, a "home" position is established for actuator 106 and for manifold 27. All other control valve solenoids are de-energized whenever the machine is stopped, so that both high pressure and low pressure supply lines are disconnected from pump cylinders 64 and 84.

Before machine 20 is started again, plungers 68 and 88 should be retracted to their ready positions as exemplified by the position of plunger 88 in FIG. 5. This can be readily accomplished by separate controls for solenoids 203 and 233, operated in conjunction with sensing switches 77 and 97. Preferably, separate contacts in sensing switches 77 and 97 are used for this purpose to avoid confusion in machine operation, relative to the normal pump sequence control described above. Additional energizing circuits may be provided for solenoids 203 and 233 to retract the pump plungers to their respective cleaning positions 68A and 88A (FIG. 5).

In actuator system 180 (FIG. 18) pump 184 preferably comprises a variable volume self-compensating pump capable of automatically maintaining a given set pressure. A remote linkage connects pump 184 to a pressure adjustment knob 190 that is accessible to the machine operator (FIGS. 1 and 18). In addition, the actuator system incorporates a pressure gauge 170, in line 182, mounted on the machine in close proximity to the adjustment knob 190. Gauge 180 can be calibrated to afford the operator a direct indication of the molding pressure for the meat or other material being molded, since the gauge reads the pressure of the hydraulic fluid supplied to pumps 61 and 62.

The machine operator can select any given molding pressure by actuating knob 190 to adjust pump 184 until the desired pressure is indicated on gauge 170. Accumulator 183 stores enough hydraulic fluid to keep the pressure drop minimal during filling of the mold cavities 126. The consistent pressure applied to the molded product in each stroke of the machine affords an excellent weight control for the molded food patties produced by the machine. The adjustable pressure afforded by system 180 allows the machine operator to compensate, while machine 20 is in operation, for changes in viscosity of the moldable food material which may be caused by slight changes in temperature, moisture content, and other factors.

CONCLUSION

The patty molding machine 20 is susceptible of a wide variety of modifications while retaining the substantial advantages of the present invention. For example, the number, size, and arrangement of the mold cavities 126 in mold plate 32 can be varied to suit production needs; a mold plate change and a corresponding change of knockout cups 15 all that is necessary, and is easily accomplished with the mold changeover system shown in FIGS. 14–16. A linear arrangement of mold cavities 126 and a single outlet passageway 111 feeding those cavities has been illustrated, but two or even more mold feed passageways and a corresponding arrangement of mold cavities can be utilized if desired.

The number of feed screws 51–53 is not critical. There should be at least one feed screw or similar device for each pump, but additional feed screw capacity may be added as needed. Two food pumps will ordinarily afford the most efficient pumping system, but a larger number may be employed to take advantage of available pump components or for other economic reasons. Pneumatic or even mechanical drive and control apparatus can be utilized for pumps 61 and 62 and manifold 27, instead of the illustrated hydraulic system; however, a hydraulic system is usually quieter and more reliable.

The time cycle for the molding mechanism 28 can be established within rather wide limits to suit production needs. A cyclic molding rate of forty to eighty cycles per minute has been used effectively and successfully in machine 20, affording a high production rate and uniform product. The number of mold cycles for each pump cycle varies in accordance with the volume of the mold cavities. Typically, the mold cavities may be filled ten or more times from one pump before changeover to the other pump occurs.

The electrical control system for molding machine 20 has not been illustrated because it is not critical to the invention and can be varied to suit the needs and desires of the user. Conventional relay circuits are readily adaptable to the control requirements of the machine, but more sophisticated sequence controls can be employed. It may also be noted that the specific cylindrical valve arrangement comprising valve cylinder 101, for manifold 27, can be replaced by other valve structures, such as gate valves or poppet valves. However, the tubular valve arrangement comprising cylinder 101 is highly efficient in conditioning manifold 27 for alternate acceptance of food material, under relatively high pressure, from the two food pumps 61 and 62, while allowing rapid and convenient removal of all of the valve elements for cleaning, as is frequently necessary for food processing machinery.

The food patty molding machine 20 fills its mold cavities under uniform pressure, regardless of which of the two food pumps 61 and 62 is in operation at any given moment, so that the molded food product of the machine is highly uniform in its weight, size, and other characteristics. The high pressures developed by the piston pumps incorporated in the machine, and the relatively large size of the pumps, make it possible to use machine 20 with food material that is of high viscosity; indeed, machine 20 is capable of producing a uniform product even from a food material that is partially frozen when furnished to the machine. Because the food pumps have a much higher capacity than the molding mechanism of the machine, and hence work on a substantially different and slower operating cycle, molding machine 20 is much quieter and can function at a substantially higher rate than conventional equipment.

The number of moving parts in molding machine 20 is minimal and the machine is capable of operating for extended periods at a high rate of production with very limited maintenance. The changeover of molding machine 20 from one product to another can be accomplished in a relatively short period of time; a complete changeover entailing different molds and an entirely different food material requires less than five minutes. The consistent pressure applied by pumps 61 and 62 in the molding of each group of food patties affords precise weight control, whereas the adjustable pressure control allows the machine operator to compensate easily for minor changes in the viscosity of meat during an extended run. The machine is arranged so that all heavy parts (mold cover and plungers) are moved to their cleaning positions under power. All moving parts projecting outwardly of cabinet 21 are rotary or reciprocating members, so that the cabinet can be completely sealed and does not require internal cleaning. Actually, only eight simple parts require removal for cleaning purposes.

I claim:

1. A high speed food patty molding machine comprising:

a multiple-cavity, cyclically operable molding mechanism *which requires a given volume of food material in each cycle of operation, the molding mechanism* having an inlet for supplying food material simultaneously to all of the cavities, the molding mechanism inlet being closed for a major portion of each molding cycle;

two food pumps, each pump comprising a fixed cavity having an intake opening at one end and an outlet opening at the other end, a plunger aligned with the intake end of the cavity, and drive means for moving the plunger between a retracted ready position clear of the intake opening in the cavity and a pressure position in which the piston is advanced inwardly of the cavity beyond the intake opening toward the outlet opening;

supply means for supplying moldable food material to the intake opening of each pump cavity whenever the plunger for that pump is in its retracted position;

a manifold connected to the outlet openings of the two pump cavities and having an outlet passageway connected to the molding mechanism inlet to supply a substantially unrestricted flow of food material thereto;

actuating means for actuating the pump drive means in overlapping alternation so that at least one pump cavity always contains moldable food material under a given minimum mold-filling pressure and, when the material in one cavity reaches a given minimum volume, both pump cavities contain moldable food material under the aforesaid mold-filling pressure for a limited pump changeover interval;

[and] valve means for sealing off the outlet opening of each pump cavity from the manifold whenever the plunger for that pump is moved toward its retracted position, in an overlapping cycle such that both outlet openings communicate with the inlet to the molding mechanism during a part of said changeover interval, thereby affording a continuous supply of moldable food material, under continuous pressure, at the inlet of the molding mechanism[.];

*the capacity of each food pump cavity being several times said given volume so that each pump supplies the molding mechanism for a plurality of molding cycles without requiring an intake of additional food material;*

*and the drive means for each food pump comprising a fluid pressure actuated power cylinder and a piston which advances the plunger and the food material in the food pump cavity during a part of each mold cycle in which the mold fills with food material and stalls against the food material trapped in the food pump cavity during a part of each mold cycle after the mold is filled.*

2. A high speed food patty molding machine, according to claim 1, in which the valve means is incorporated in the manifold and comprises:

a valve cylinder extending across the outlet openings of both food pumps, the valve cylinder including at least one inlet opening for receiving food material from the food pumps and an outlet opening communicating with the manifold outlet passageway;

and a valve actuator for rotating the valve cylinder between a first angular position in which food material is pumped from a first pump into the valve cylinder and out through the manifold outlet passageway to the molding mechanism, an intermediate angular position in which food material is pumped simultaneously from the first pump and a second pump into the valve cylinder and out through the manifold outlet passageway to the molding mechanism, and a second angular position in which food material is pumped from the second pump into the valve cylinder and out through the manifold outlet passageway to the molding mechanism.

3. A high speed food patty molding machine, according to claim 2, in which the food pumps are positioned side-by-side, in which the valve cylinder includes two inlet openings, one for each pump, longitudinally displaced relative to each other and angularly displaced relative to the pump cavity outlets, and in which the outlet opening of the valve cylinder is an elongated longitudinal slot, angularly skewed relative to the manifold outlet passageway to balance the rate of feed to the molding mechanism for food material pumped from both pumps.

4. A high speed [foot] *food* patty molding machine, according to claim 1, in which the supply means comprises a hopper for receiving food material, a conveyor for conveying the food material to one end of the hopper adjacent the intake openings of the food pumps, and a plurality of feed devices for feeding the food material to the intake openings of the food pumps in synchronism with the operation of the pumps.

5. A high speed food patty molding machine, according to claim 4, in which the conveyor comprises a belt forming the bottom of the hopper, a conveyor drive for driving the conveyor belt, and sensing means for interrupting the conveyor drive whenever the moldable food material accumulated at said one end of the hopper exceeds a given level.

[6. A high speed food patty molding machine according to claim 1 in which the molding mechanism requires a given volume of food material in each cycle of operation, and in which the capacity of each food pump cavity is at least several times that given volume, so that each pump can supply the molding mechanism for a plurality of operational molding cycles without requiring an intake of additional food material.]

[7. A high speed food patty molding machine, according to claim 6, in which the drive means for each food pump comprises a fluid pressure actuated power cylinder and a piston which advances the plunger and the food material in the food pump cavity during a part of each mold cycle in which the mold fills with food material and stalls against the food material trapped in the food pump cavity during a part of each mold cycle after the mold is filled.]

8. A high speed food patty molding machine, according to claim [7] *1*, in which the drive means for each fluid pump includes a low-pressure fluid supply for advancing the piston and plunger to an initial pumping position, a high-pressure fluid supply for advancing the piston and plunger beyond the initial pumping position, and changeover means for automatically changing over from the low-pressure supply to the high-pressure supply in response to the plunger stalling against food material trapped in the pump cavity.

9. A high speed food patty molding machine, according to claim 8, in which the changeover means for each pump comprises a pressure-sensing device, connected to the power cylinder, for sensing a build-up of pressure in the cylinder when the pump plunger stalls against food material in the pump cavity while the piston is being advanced by the low-pressure supply.

10. A high speed food patty molding machine, according to claim 9, in which the valve means is actuated to seal off one pump cavity from the manifold and open the other pump cavity to the manifold, and in which the plunger for said one pump is retracted to its ready position, in response to sensing of high pressure in both power cylinders.

11. A high speed food patty molding machine, according to claim 1, in which the food pump cavities and the manifold comprise a common housing that includes the molding mechanism inlet, and in which the molding mechanism comprises:

a sliding multi-cavity mold plate mounted on that housing for reciprocal movement between a filling position at which the mold cavities are aligned with the molding mechanism inlet and a discharge position at which the mold cavities are clear of the housing;

a mold cover positioned over the mold plate;

a knockout mechanism mounted on the mold cover;

and power-driven means for elevating the mold cover and knockout mechanism clear of the mold plate to allow cleaning of the molding mechanism and replacement of the mold plate.

12. A high speed food patty molding machine, according to claim 1, in which said molding mechanism comprises a reciprocating mold plate, a crank drive for actuating the mold plate between filling and discharge positions, and a hydraulic cushion device incorporated in the crank drive.

* * * * *